March 1, 1955 M. S. OLIVER 2,702,955
EMERGENCY WARNING SIGN
Filed July 1, 1954
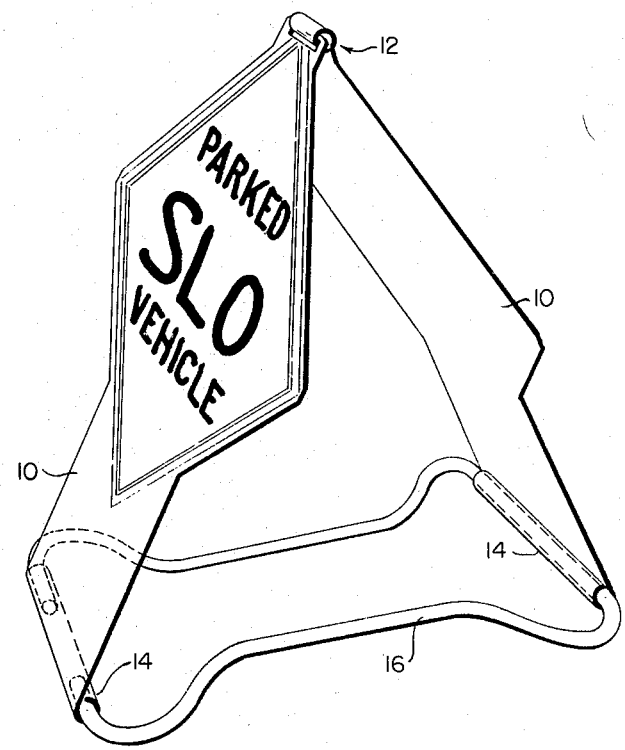
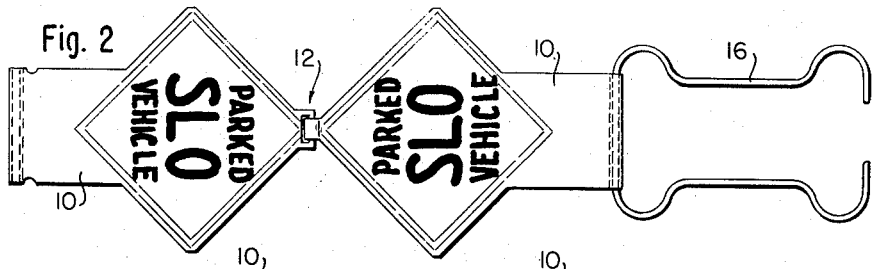
INVENTOR.
MYLES S. OLIVER
BY
Kenway, Jenney, Witter & Hildreth
ATTORNEYS United States Patent Office 2,702,955
Patented Mar. 1, 1955

2,702,955

EMERGENCY WARNING SIGN

Myles S. Oliver, Houlton, Maine

Application July 1, 1954, Serial No. 440,720

10 Claims. (Cl. 40—125)

This invention relates to emergency warning signs, and more particuarly to collapsible emergency warning signs which may be conveniently erected for use or collapsed for stowage.

Oftentimes in the operation of motor vehicles of all types, it becomes necessary for emergency reasons or otherwise to park the vehicle alongside the road in a somewhat exposed position. At such times the vehicle may be in danger because other motorists approaching the parked vehicle may not be aware of the fact that it is stationary and an accident may result through inadvertence. Also when a tire must be changed, it is often necessary for the operator to take an exposed position on the road side of the parked car. For these reasons, it is highly desirable to place an emergency warning sign down the road from the parked vehicle in order to call attention to the fact that the vehicle is parked, and thereby lessen the danger of accidents through inadvertence of the oncoming motorists.

It is an important object of my invention to provide an emergency warning sign which at one and the same time is readily visible, both during daylight and darkness. Another object of my invention is to provide an emergency warning sign which takes up a minimum of space for stowage purposes, but which may be erected rapidly, securely and conveniently for use.

In the accomplishment of these and other objects of my invention, I employ in a preferred embodiment thereof a pair of hinged sheet metal plates, and on the outer face thereof I place an emergency warning sign indicating the presence of a parked vehicle. The letters of this sign may conveniently be fabricated of a reflecting substance, such as "Scotchlite" with a bright contrasting background so that they may be readily seen both during daylight and darkness. When the sign is erected, the plates are held in slanting opposed relation with the hinge element thereof at the top and held apart at the base by a heavy wire loop arrangement which is pivotally connected to the base of one plate and which fits into the base of the other plate in locking engagement therewith. To stow the emergency sign, the above-mentioned heavy wire element is disengaged from the base of one of the plates, the plates are swung over the top until the two outer surfaces lie in opposed relation flatly one against the other, and thereafter the wire element which was previously employed to lock the warning sign in the erected position is clipped over the top of the two plates and in that position serves to lock the warning sign in the stowage position.

It is a feature of my invention that it is very light in construction, and occupies an extremely small space in the stowage position. It may be securely locked in both the erected or stowage positions.

Another feature of my invention is that it is extremely simple in its construction, having very few moving parts, and no element that is easily damaged. Perhaps the most sensitive or vulnerable portion of my invention is the reflecting surface of the emergency warning sign, and it will be seen that this surface is fully protected in the stowage position by pivoting the two plates together with the reflecting surfaces opposed to each other.

Further objects and features of my invention will best be understood and appreciated from a detailed description of a preferred embodiment thereof, selected for purposes of illustration, and shown in the accompanying drawings, in which:

Fig. 1 is a view in perspective of the device of my invention in the erected position;

Fig. 2 is a plan view of my invention with all members folded out into a single plane;

Fig. 3 is a view in side elevation of the elements shown in Fig. 2; and

Fig. 4 is a plan view of the device in the locked stowage position.

The preferred embodiment of my invention herein shown includes a pair of relatively light, but rigid, sheet metal plates 10. The plates 10 are pivotally connected at 12 by a hinge which may be formed by a rolled extension of one plate fitting into an open slot of the other plate. It will be understood, of course, that other forms of hinge may be equally suitable. Each of the plates 10 bears an emergency warning sign on one surface thereof, which may conveniently be as shown depicting the words, "PARKED SLO VEHICLE." In this preferred embodiment the emergency warning sign is printed with a highly reflective substance, such as "Scotchlite" and the background is given a sharp and contrasting color. One preferred arrangement is to use a white "Scotchlite" and a bright red background.

The plates 10 are maintained in an erected position by means of a stiff metal wire 16 which is pivotally connected to the base of one of the plates 10 entering a tubular rolled portion 14. The other plate 10 is also provided with a tubular rolled portion 14 and the outer end of the wire 16 fits into this latter-mentioned tubular portion 14 to lock the emergency warning sign in the erected position. The wire 16 is made of relatively heavy and resilient metal, and in its normal position the distance between the two outer ends thereof is substantially less than the width of the rolled portion 14 so that in the erected position, the spring nature of the wire 16 retains the ends of the wire 16 in the appropriate rolled portion 14 thereby maintaining the emergency warning sign locked in the erected position.

In order to collapse the emergency warning sign the outer ends of the wire 16 are pulled out of their related rolled portion 14. The plates 10 are thereafter pivoted around until the reflecting surfaces are in opposed relationship thereby protecting each other, and thereafter the wire 16 is pivoted around, spread and locked over the top portion of the joined plates 10 as may be seen in Fig. 4. It will be seen that in the stowage position, the device is extremely compact, secure and occupies very little space.

From the foregoing description, it will now be seen that the emergency warning sign of my invention has numerous advantages. While it has been stated that the sign is firm and secure in the erected position, it will also be seen that, due to its light construction, it does not constitute a dangerous obstruction on the road. In other words, in the event that an oncoming vehicle accidentally runs over the sign, the sign simply collapses without damaging the tires of the oncoming vehicle. Also it should be noted that the emergency warning sign of my invention is suitable for use in connection with all types of vehicles including gasoline trucks and other vehicles carrying inflammable substances. Since there are no electrical leads or burning members, there is absolutely no danger of causing accidental combustion as is the case when conventional lights or flares are employed.

While the preferred embodiment of my invention herein shown may readily be changed in certain respects without departing from the spirit of the invention, certain features of it are considered to be essential to the invention. In the first place, the wire locking arrangement bears a somewhat critical relationship to the overall dimensions of the sign itself in that it is adapted to lock into the rolled portion 14 in the erected position, and also to lock over the tops of the plates 10 in the stowage position. Thus while the plates 10 may take different form and the wire 16 may also take a somewhat different form, the shapes of these two elements cannot be so altered as to preclude the two locking functions of the ends of the wire 16. Therefore, it is not my intention to confine the invention to the precise form of the preferred embodiment herein shown, but rather to limit it in terms of the appended claims.

Having thus described and disclosed a preferred embodiment of my invention, what I claim as new and desire to secure by Letters Patent is:

1. An emergency warning sign comprising a pair of hingedly connected plates arranged to swing from a stowage position with the outer surfaces of said plates in face-to-face relation to an erected position with said outer surfaces exposed, reflecting indicia on the outer surface of one said plate, a sharply contrasting background for said indicia, and mechanism for locking said plates in said stowage and erected positions including a locking member pivotally connected to one said plate, means for connecting an outer end of said locking member to the other said plate to retain said plates in the erected position, and means associated with said locking member arranged to retain said plates in face-to-face relation when in said stowage position.

2. The emergency warning sign defined in claim 1 further characterized by resilient means operatively associated with said locking member yieldably holding said locking member in its various positions of locking retention.

3. The emergency warning sign defined in claim 1 further characterized by said locking member comprising a heavy resilient wire.

4. An emergency warning sign comprising a pair of plates hingedly connected at the top thereof to pivot from a closed, stowage position with the outer surfaces of said plates in face-to-face relation to an opened, erected position with said outer surfaces exposed and in downwardly slanting relation, reflecting indicia on the outer surface of one said plate, and mechanism for locking said sign in the stowage and erected positions comprising a locking member having a base, a middle portion, and an outer end, means for pivotally connecting said locking member to one said plate, means for detachably connecting the outer end of said locking member to the other said plate when in said erected position, and when in said stowage position, the middle portion of said locking member arranged to bear against one said plate and the outer end of said locking member arranged to hook around and bear against the other said plate whereby to hold the two said plates in face-to-face relation.

5. The emergency warning sign defined in claim 4 further characterized by resilient means operatively associated with said locking member yieldably holding said locking member in its various positions of locking retention.

6. The emergency warning sign defined in claim 4 further characterized by said locking member comprising a heavy resilient wire.

7. An emergency warning sign comprising a pair of plates hingedly connected at the top thereof to pivot from a closed, stowage position with the outer surfaces of said plates in face-to-face relation to an opened, erected position with said outer surfaces exposed and in downwardly slanting relation, reflecting indicia on the outer surface of one said plate, and mechanism for locking said sign in the stowage and erected positions comprising a resilient wire pivotally connected at its base to the base of one said plate, said wire bent to provide a middle portion which abuts said plate when said wire is pivoted towards the same, and said wire being further bent to provide an end portion which through the resiliency of the wire may be hooked around to bear against the other plate when in the stowed position whereby to hold the two said plates in face-to-face relation, and means for cross-connecting the said wire between the bases of the two said plates when in the erected position.

8. An emergency warning sign comprising a pair of plates, reflecting indicia on the outer surface of one said plate, hinge means connecting said plates at their tops permitting the plates to pivot from a stowage position with the plates in face-to-face relation to an erected position with the outer surfaces of said plates exposed, tubular portions lying horizontally along the base of each said plate, a resilient wire member pivotally retained in one said tubular portion, outer ends for said wire spaced apart by a distance less than the length of the tubular member at the base of the other said plate whereby said outer ends may be opened against the resilient force of said wire and placed in said tubular member to retain said sign in the erected position, said plates being further dimensioned relative to the outer ends of said wire slightly wider than the distance between the said outer ends in the area of said plates adjacent to the wire when the wire is pivoted into substantial parallelism with the plates in the stowage position whereby the ends of the wire may be hooked around the said plates by spreading the said ends against the resiliency of the wire.

9. The emergency warning sign defined in claim 8 further characterized by a middle portion of said wire abutting one side of said plate in the stowage position while the said outer ends of the wire are being hooked around to the opposite side.

10. The emergency warning sign defined in claim 9 further characterized by said wire being formed in a single plane with widened portions serving as a base for said sign when in the erected position.

No references cited.